(12) United States Patent
Mutlu et al.

(10) Patent No.: US 11,719,937 B2
(45) Date of Patent: Aug. 8, 2023

(54) HEAD-MOUNTED ELECTRONIC DEVICE WITH SELF-MIXING SENSORS

(71) Applicant: Apple Inc., Cupertino, CA (US)

(72) Inventors: Mehmet Mutlu, San Jose, CA (US); Serhan O. Isikman, Redwood City, CA (US); Zachary A. Granger, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 17/230,341

(22) Filed: Apr. 14, 2021

(65) Prior Publication Data

US 2021/0302745 A1 Sep. 30, 2021

Related U.S. Application Data

(60) Provisional application No. 63/028,458, filed on May 21, 2020.

(51) Int. Cl.
*G02B 27/01* (2006.01)
*G01B 9/02* (2022.01)
*G03B 17/12* (2021.01)

(52) U.S. Cl.
CPC ..... *G02B 27/0172* (2013.01); *G01B 9/02092* (2013.01); *G03B 17/12* (2013.01); *G02B 2027/0138* (2013.01)

(58) Field of Classification Search
CPC .............. G01B 9/02092; G02B 27/017; G02B 27/0172; G02B 27/0176; G02B 2027/0138; G02B 2027/0161; G02B 2027/0163; G03B 17/12
See application file for complete search history.

(56) References Cited

U.S. PATENT DOCUMENTS

| 10,495,879 | B1 | 12/2019 | Ahuja et al. |
| 10,571,263 | B2 | 2/2020 | Abovitz et al. |
| 2014/0320974 | A1 | 10/2014 | Magyari |
| 2016/0266381 | A1 | 9/2016 | Honsho |
| 2018/0003919 | A1 | 1/2018 | Song et al. |
| 2019/0179409 | A1 | 6/2019 | Jones et al. |
| 2019/0313178 | A1 | 10/2019 | Mutlu et al. |
| 2019/0331828 | A1 | 10/2019 | Mutlu et al. |

(Continued)

FOREIGN PATENT DOCUMENTS

| DE | 102016226294 A1 | 7/2018 |
| WO | 2021055327 A1 | 3/2021 |
| WO | 2021055343 A1 | 3/2021 |

*Primary Examiner* — Nelson M Rosario
(74) *Attorney, Agent, or Firm* — Treyz Law Group, P.C.; G. Victor Treyz; Joseph F. Guihan

(57) ABSTRACT

A head-mounted device may have a head-mounted housing and optical components supported by the head-mounted housing. The optical components may include cameras, movable optical modules, and other components. Each optical module may include a display that displays an image and a lens that provides the image to a corresponding eye box. Optical self-mixing sensors may be included in the optical modules and other portions of the head-mounted device to measure changes in optical component position. In response to detecting a change in optical component position, actuators in the device may be adjusted to move the optical components or other action may be taken to compensate for the change.

14 Claims, 10 Drawing Sheets

(56) References Cited

U.S. PATENT DOCUMENTS

| | | |
|---|---|---|
| 2020/0026079 A1 | 1/2020 | Franklin et al. |
| 2020/0088999 A1 | 3/2020 | Wang |
| 2021/0096382 A1 | 4/2021 | Osterhout et al. |
| 2021/0271320 A1* | 9/2021 | Fiess ............... A61B 3/113 |
| 2022/0155599 A1* | 5/2022 | Lychagov .......... G02B 27/0172 |

* cited by examiner

HEAD-MOUNTED ELECTRONIC DEVICE WITH SELF-MIXING SENSORS

This application claims the benefit of provisional patent application No. 63/028,458, filed May 21, 2020, which is hereby incorporated by reference herein in its entirety.

FIELD

This relates generally to electronic devices, and, more particularly, to electronic devices such as head-mounted devices having optical components.

BACKGROUND

Electronic devices such as head-mounted devices may have displays for displaying images and may have other optical components.

SUMMARY

A head-mounted device may have a head-mounted housing. Optical components may be supported by the head-mounted housing. The optical components may include cameras such as front-facing cameras and/or optical modules that have displays for displaying images to eye boxes.

Optical self-mixing sensors may be provided in the head-mounted device to detect changes in position between portions of the head-mounted device. These changes may include changes in the positions between optical module components such as lenses and displays. These changes may also involve movement of optical components such as cameras.

In response to detecting a change in optical component position using the optical self-mixing sensors (e.g., a change indicating that a component or other structure has moved from its desired position), actuators in the device may be adjusted to move the optical components or other action may be taken to compensate for the change.

DETAILED DESCRIPTION

An electronic device such as a head-mounted device may have optical components. The optical components may include optical modules that are used to provide images to a user's eyes. The head-mounted device may also have other optical components such as cameras. Components in a head-mounted device have the potential to experience misalignment if the device is subjected to stress during a drop event or other high stress event. To ensure that the device operates satisfactory, optical self-mixing sensors may be used to accurately measure the positions of components in the head-mounted device. Actuators may then move the optical components to compensate for any detected changes in position and/or other compensating action may be taken.

Figure 1:
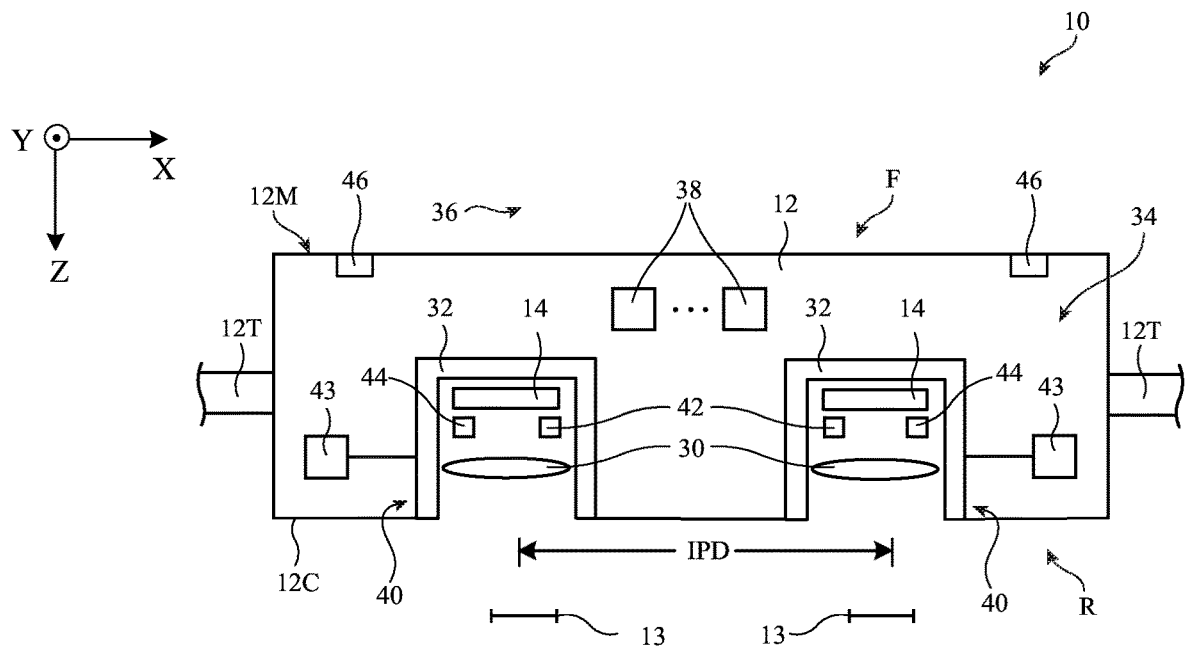
FIG. 1 is a top view of an illustrative head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. Housing portion 12M may also have internal support structures such as a frame and/or structures that perform multiple functions such as controlling airflow and dissipating heat while providing structural support. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C. The presence of cover 12C on rear face R may help hide internal housing structures, internal components 38, and other structures in interior region 34 from view by a user.

Device 10 may have one or more cameras such as cameras 46 of FIG. 1. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than ten, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with optical module positioning systems in housing 12. The positioning systems may have guide members and actuators 43 that are used to position optical modules 40 with respect to each other.

Actuators 43 can be manually controlled and/or computer-controlled actuators (e.g., computer-controlled motors) for moving support structures (lens barrels) 32 relative to each other. Information on the locations of the user's eyes may be gathered using, for example, cameras 42. The locations of eye boxes 13 can then be adjusted accordingly.

Figure 2:
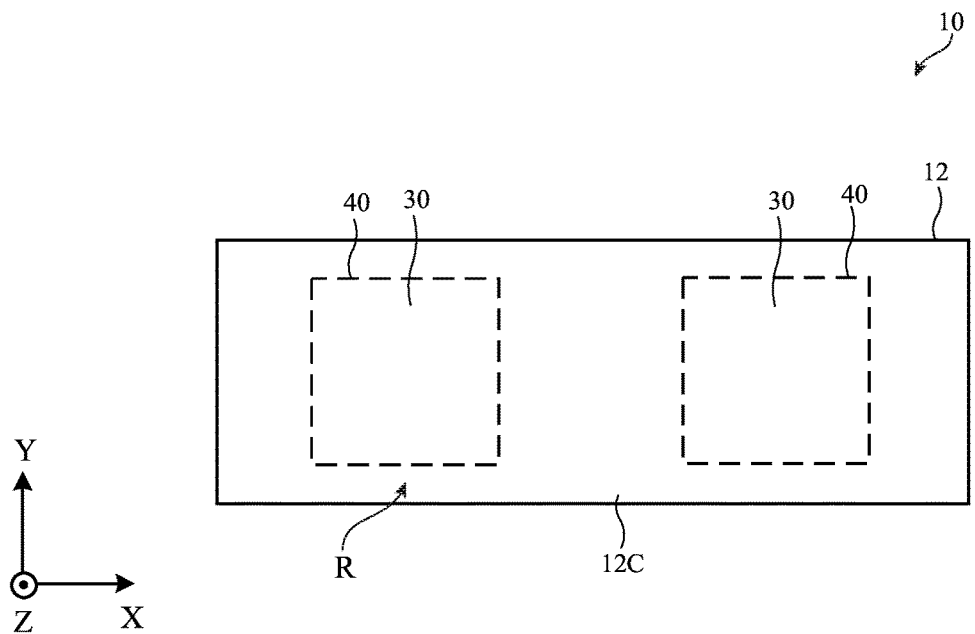
FIG. 2 is a rear view of an illustrative head-mounted device in accordance with an embodiment.

As shown in the rear view of device 10 of FIG. 2, cover 12C may cover rear face R while leaving lenses 30 of optical modules 40 uncovered (e.g., cover 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other.

Figure 3:
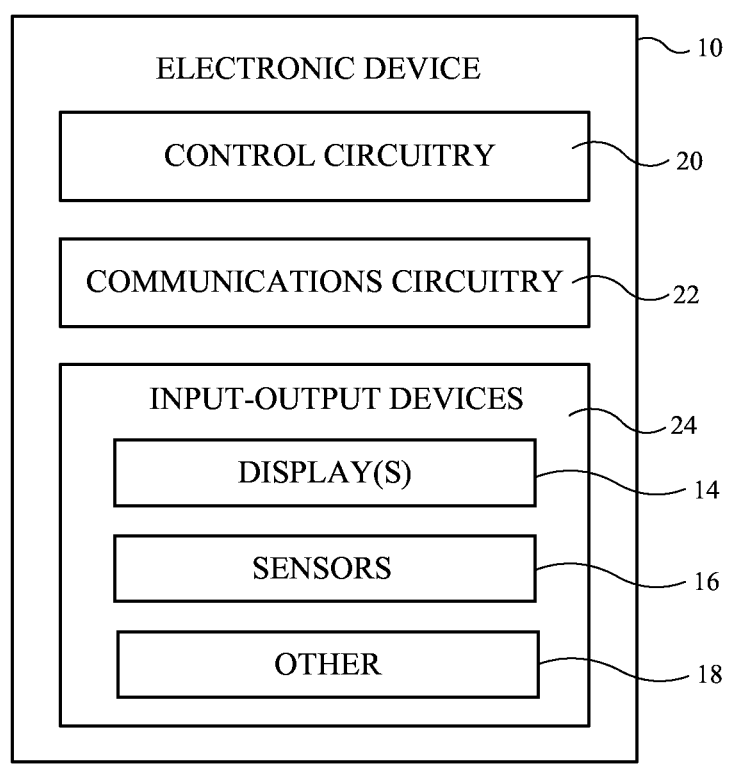
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid-state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, interferometric sensors, time-of-flight sensors, magnetic sensors, resistive sensors, distance sensors, angle sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

It is desirable for optical components in device 10 to remain in satisfactory alignment during operation of device 10. Due to a drop event or other event imparting stress on device 10, there is a risk that the positions of displays, lenses, cameras, other optical components, and/or other structures in device 10 will move relative to their initial positions. To ensure that device 10 operates satisfactorily, even if subjected to large amounts of stress, device 10 may use sensors to measure component positions. In response to measuring a change in component position, device 10 (e.g., control circuitry 20) can take compensating action (e.g., by using an actuator to adjust the position of the component to ensure that the component is positioned satisfactorily, by warping image data associated with a camera or display to compensate, etc.). In an illustrative configuration, which may sometimes be described herein as an example, one or more actuators may be used to reposition a moved optical component so that the optical component remains in its desired position even when device 10 is subjected to drop events and other high stress events. Configurations in which actuators use measured position information while moving lenses, displays, and/or other components to adjust focus and/or otherwise adjust the operation of the optical components may also be described herein as examples.

It may be desirable to measure relatively small changes in component position, so that components can be maintained in desired positions. For example, it may be desirable to maintain the position of a lens or other component in its original position within a tolerance of less than 30 microns, less than 20 microns, less than 7 microns, or less than 3 microns (as examples). In maintaining tight tolerances for the optical components in device 10, it may be desirable to take correspondingly accurate position measurements. In an illustrative configuration, which is described herein as an example, optical position sensors such as optical self-mixing sensors are used to measure component positions within these tight tolerances (e.g., with an accuracy of better than 10 microns, better than 2 microns, or better than 1 micron, or other suitable accuracy). Submicron position measurement accuracy or other satisfactory measurement precision allows lenses, displays, cameras, and/or other optical components to be placed in desired locations without introducing significant misalignment errors.

Figure 4:
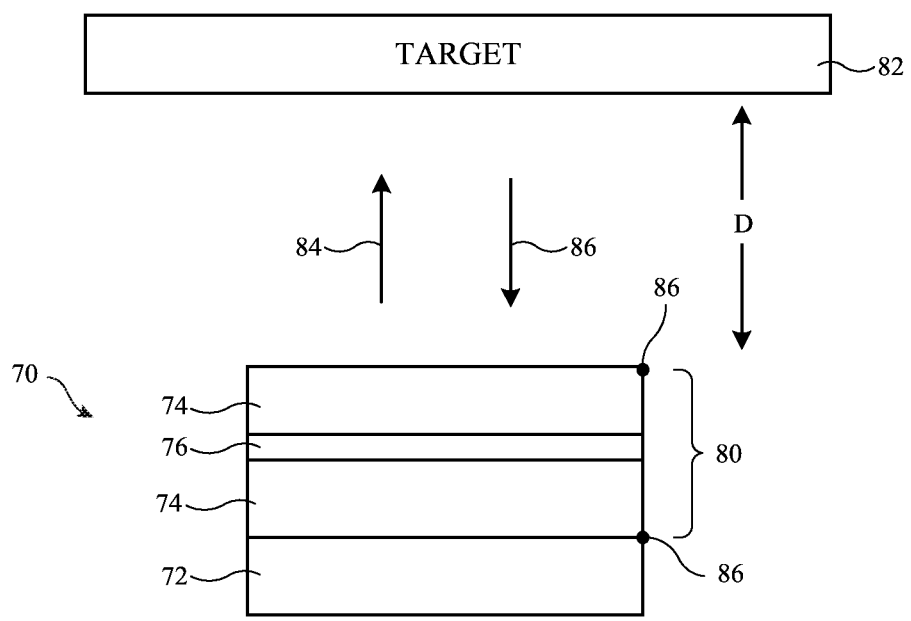
FIG. 4 is a diagram of an illustrative self-mixing sensor in accordance with an embodiment.

An illustrative optical self-mixing sensor is shown in FIG. 4. Self-mixing sensor 70, which may sometimes be referred to as an optical self-mixing position sensor or self-mixing orientation sensor may be used to measure distance and therefore determine the relative position between the sensor and a target structure. In some configurations, angular orientation may be measured using one or more self-mixing sensors. For example, angular tilt may be measured by measuring two or more distances. Tilt about one axis may, as an example, be measured using a pair of distance measurements made at different respective locations on a component, whereas tilt about two axes may be measured using three such distance measurements. Arrangements in which self-mixing sensors are referred to as measuring distance, displacement, or position may sometimes be described herein as an example. In general, position, angular orientation, changes in position and/or orientation, and/or other self-mixing sensor measurements may be directly gathered and/or may be derived from the measurements of distance from self-mixing sensors.

In the example of FIG. 4, self-mixing sensor 70 is being used to measure the separation (distance D) between sensor 70 and target 82. Target structures in device 10 such as target 82 of FIG. 4 may be portions of lenses (e.g., lenses 30 of FIG. 1), portions of support structures (e.g., a lens barrel or other support structure 32 for a lens and/or other optical module components), display structures (e.g., displays 14), portions of cameras (e.g., cameras 46 and/or cameras 42), and/or other structures in device 10 (e.g., housing structures in portion 12M). Self-mixing sensors such as sensor 70 may be mounted on or adjacent to housing structures (e.g., a structure in portion 12M) and/or sensor 70 may be mounted on or adjacent to lenses (e.g., lenses 30 of FIG. 1), portions of support structures (e.g., lens barrel 32), display structures (e.g., displays 14), portions of cameras, and/or other structures in device 10 (e.g., housing structures in portion 12M). In this way, distance D may correspond to a display-to-lens measurement or housing-to-lens measurement that reveals information on lens alignment and/or may otherwise be used in measuring distances between lenses, cameras, displays, housing structures, etc. In the event that measurements with one or more sensors 70 reveal that a component is misaligned relative to its desired position, compensating action may be taken. For example, control circuitry 20 may use an actuator to move a lens, display, camera, or other component in device 10 to compensate for measured changes in component position. If, as an example, lens 30 is 30 microns too far from display 14, lens 30 may be moved towards display 14 by 30 microns.

As shown in the illustrative configuration of FIG. 4, self-mixing sensor 74 may include a laser such as vertical cavity surface emitting laser 80 (e.g., self-mixing proximity sensor 70 may be a coherent self-mixing sensor having a diode laser or other coherent or partially coherent source of light or other electromagnetic radiation). Laser 80 may have thin-film interference filter mirrors 74 (sometimes referred to as Bragg reflectors) each of which is formed from a stack of thin-film layers of alternating index of refraction. Active region 76 may be formed between mirrors 74. The lower mirror in laser 80 may have a nominal reflectivity of less than 100% to allow some of the light of laser 80 to reach overlapped photodiode 72 or, in configurations in which photodiode 72 is located elsewhere in sensor 70 (e.g., laterally adjacent to laser 80), the lower mirror may have a nominal reflectivity of 100%. The upper mirror in laser 80 may have a slightly lower reflectivity, so that laser 80 emits light 84 towards target 82. Laser 80 may be controlled by applying a drive signal to terminals 86 using control circuitry 20 (e.g., a drive circuit in circuitry 20). Sensing circuitry (e.g., photodiode 72 and/or associated sensing circuitry in circuitry 20) can measure the light output of laser 80 (as an example).

Emitted light 46 may have an infrared wavelength of 850-1200 nm, 800 nm to 1100 nm, 920-960 nm, at least 800 nm, at least 900 nm, at least 1000 nm, less than 1200 nm, less than 1100 nm, less than 1000 nm, or less than 900 nm, or other suitable wavelength (e.g., a visible wavelength, an ultraviolet wavelength, an infrared wavelength, a near-infrared wavelength, etc.). When emitted light 84 illuminates target 82, some of emitted light 84 will be reflected backwards towards sensor 70 as reflected light 86 (e.g., light that is specularly reflected from target 82 and/or that is backscattered from a matte surface in target 82).

Sensor 70 of FIG. 4 includes a light sensitive element (e.g., a light detector such as photodiode 72). Photodiode 72 in the example of FIG. 4 is located under laser 80, but configurations in which photodiode 72 is adjacent to laser 80, is located on a separate substrate than laser 80, is located above active area 76, and/or has other configurations may be used, if desired. The terminals of photodiode 72 may be coupled to sensing circuitry in control circuitry 20. This circuitry gathers photodiode output signals that are produced in response to reception of reflected light (specularly reflected and/or backscattered portions of emitted light 84) such as reflected light 86. In addition to using a photodiode, self mixing can be detected using laser junction voltage measurements (e.g., if the laser is driven at a constant bias current) or laser bias current (e.g., if the laser is driven at a constant voltage).

Target 82 is located at a distance D from proximity sensor 70. Some of light 84 that is reflected or backscattered from target 82 as reflected light 86 reenters the laser cavity of laser 80 (i.e., this fed back light mixes with the light in the laser cavity), perturbing the electric field coherently and causing a perturbation to the carrier density in laser 80. These perturbations in laser 80 cause coherent self-mixing fluctuations in the power of emitted light 84 and associated operating characteristics of laser 80 such as laser junction voltage and/or laser bias current. These fluctuations may be monitored. For example, the fluctuations in the power of light 86 may be monitored using photodiode 72. In the example of FIG. 4, photodiode 72 is an integrated monolithic photodiode that is formed under laser 80, but other configurations may be used, if desired.

Control circuitry 20 is configured to supply drive current for laser 80 and includes circuitry for sensing the response of photodiode 72. Sensed photodiode output may include measurements of diode current and/or voltage. A modulation scheme may be used for driving laser 80 for the purpose of inducing a wavelength modulation and a photodiode output processing scheme (using measurements of photodiode current, junction voltage, bias current, etc.) may be used in processing the measured self-mixing fluctuations in output power to allow control circuitry 20 to determine the distance D between sensor 70 and target 82 in accordance with the principles of self-mixing interferometry.

A modulation scheme for driving laser 80 may, for example, use a triangular wave drive signal that, due to the dependence of output wavelength on drive current magnitude of laser 80, continuously varies the wavelength of light 84 between a first wavelength WL1 and a second wavelength WL2 during each half-period of the triangular wave. The wavelength variations of light 84 cause the self-mixing interference signal of laser 80 to exhibit ripples. If desired, other modulation schemes may be used for driving laser 80 (e.g., sinusoidal driving schemes, etc.).

The processing scheme used on the photodiode signal uses a frequency extraction transform to extract the period of the ripples, from which distance D may be calculated. Distance D may, for example, be determined with an accuracy of better than 50 microns, better than 20 microns, better than 10 microns, better than 5 microns, better than 2 microns, better than 1 micron, or other suitable accuracy. Due to this high accuracy, measurements of where a lens or other optical component is located within device 10 can be determined with sufficient precision to allow actuators to move the lens and/or other optical component to compensate for undesired drop-induced movement or to take other suitable compensating action. The frequency extraction transform can have a temporal resolution (e.g., wavelet transform) or not (e.g., Fourier transform).

Figure 5:
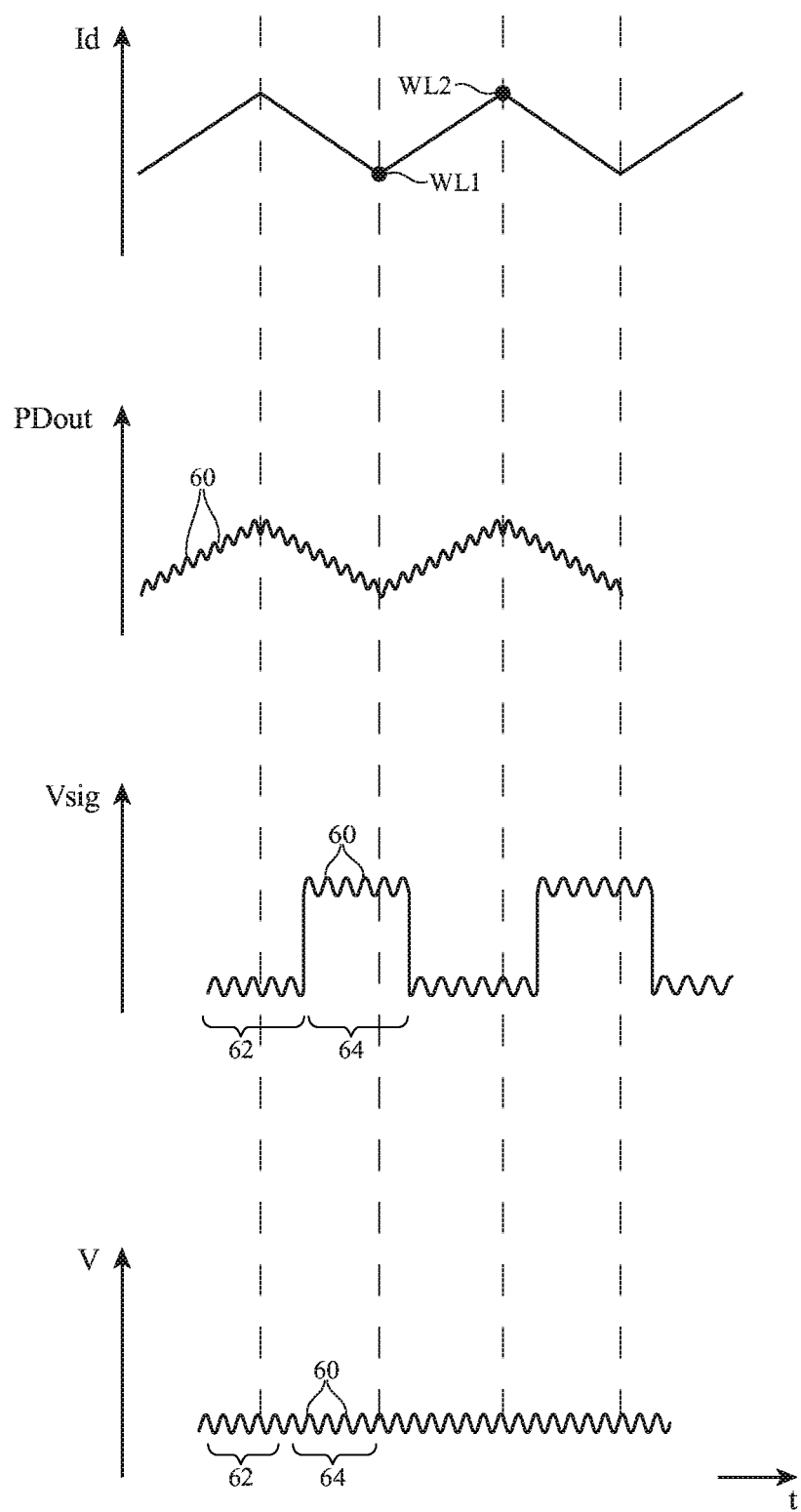
FIG. 5 contains graphs illustrating operation of the self-mixing sensor of FIG. 4 in accordance with an embodiment.

An illustrative signal processing approach for sensor 70 shown in FIG. 5.

The first (uppermost) trace of FIG. 5 shows how laser drive current Id for laser 80 may be modulated using an alternating-current (AC) signal such as a triangle wave. This modulates the temperature of laser 80 and therefore the output wavelength of light 84. For example, the wavelength of light 84 may vary between a first value WL1 (when drive signal Id is at a minimum) and wavelength WL2 (when drive signal Id is at a maximum). In accordance with the principles of self-mixing interferometry, the modulation of the wavelength of light 84 allows the self-mixing proximity sensor to measure target distance D without varying distance D.

The second (second to uppermost) trace of FIG. 5 shows how the resulting output signal PDout from photodiode 72 contains self-mixing interference ripples 60. In configurations in which laser current or laser voltage are measured, the self-mixing interference ripples will appear in the measured current or voltage.

Control circuitry 20 (e.g., a sense circuit based on an operational amplifier circuit or other sensing circuitry) may be configured to differentiate signal PDout (or the measured current or voltage of laser 80). As a result, control circuitry 20 (e.g., the sense circuit of circuitry 20) may produce an output signal Vsig, as shown in the third (third from uppermost) trace of FIG. 5. The signal Vsig is ideally a square wave onto which ripples 60 are imposed. To facilitate subsequent signal processing (e.g., processing to perform a frequency extraction transform), the mean of signal Vsig during high periods 64 may be subtracted from signal Vsig during high periods 64 (digitally or using analog circuitry in control circuitry 20), thereby equalizing the direct-current (DC) component in periods 62 and 64, as shown by signal V in the fourth (lowermost) trace of FIG. 5.

A frequency-extraction transform such as a fast Fourier transform (FFT) or other frequency-extraction transform (e.g., a Hilbert transform, a continuous or discrete wavelet transform, a multiple signal classification method, etc.) may be applied to signal V to determine the frequency of ripples 60. With one illustrative approach, the ripple frequency can be determined by identifying the frequency associated with a peak in the FFT amplitude curve. Frequencies with lower peaks in the FFT output can be assumed to be associated with noise and can be ignored. A more accurate frequency assessment can be made by fitting a curve to the peaks in the curve (e.g., processing the output amplitude of the FFT algorithm at each of the output frequencies of the FFT algorithm to identify the ripple frequency). For example, a curve such as a Gaussian curve may be fit to the frequency peaks of the output of the FFT process to accurately identify a ripple frequency fp. The frequency fp may then be used in calculating target distance D. In some illustrative configurations, other types of demodulation may be used to determine distance D. For example, IQ demodulation may be used in scenarios in which laser 80 is modulated sinusoidally. If desired, a separate phase modulator (e.g., a separate electro-optic modulator such as a lithium niobite electro-optic modulator) may be used in modulating light 84. These self-mixing modulation and signal processing arrangements and/or other arrangements may allow distances such as distance D to be measured in device 10 so that this distance information may be used in adjusting components in device 10.

Accurate distance measurements of the type that may be produced using sensor 70 may be used in providing real-time feedback on optical component positions within device 10. For example, the positions of lenses, displays, image sensors, and/or other optical components and/or the housing structures used in supporting such components may be measured using sensors such as sensor 70, so that control circuitry 20 can adjust actuators to reposition such as components and/or can take other appropriate action.

Figure 6:
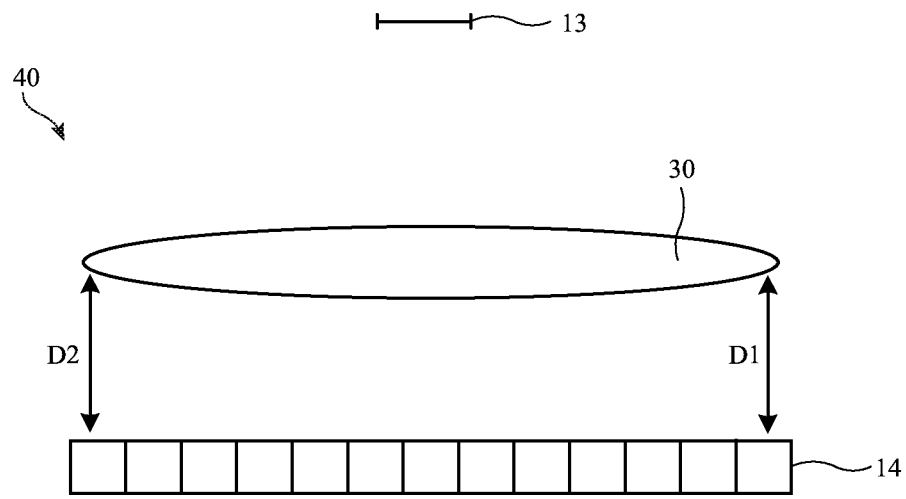
FIG. 6 is a cross-sectional side view of an illustrative display system in accordance with an embodiment.

Consider, as an example, the arrangement of FIG. 6. In the example of FIG. 6, multiple sensors 70 are being used to measure the position of lens 30 relative to display 14 (e.g., a pixel array) in optical module 40. A first sensor 70 may measure distance D1 between display 14 and lens 30 (e.g., along a right-hand edge of lens 30) and a second sensor 70 may measure distance D2 between display 14 and lens 30 (e.g., along a left-hand edge of lens 30). A third sensor 70 may, if desired, measure the separation between lens 30 and display 14 (e.g. so that the angular orientation of lens 30 in all dimensions may be determined).

By using sensors 70, the separation of lens 30 from display 14 and the orientation of lens 30 relative to display 14 may be measured. Using this type of arrangement, undesired movement of lens 30 relative to display 14, undesired movement of lens 30 relative to a housing chassis or other structural members in housing portion 12M, undesired movement of display 14 relative to lens 30 and/or housing portion 12M, and/or other undesired movements of portions of optical module 40 in device 10 may be detected.

If desired, sensors 70 may also be used to actively monitor the position of lens 30 during lens position adjustments that are being made to vary the distances of virtual images as the user is viewing content on display 14 from eye box 13. Such lens position adjustments may be made, for example, to adjust the focus of module 40 and thereby adjust the amount of accommodation needed by a user to view the image on display 14. Control circuitry 20 may, as an example, adjust lens focus to minimize or eliminate vergence-accommodation mismatch as three-dimensional content associated with the left and right images on left and right optical modules 40 is being presented to the user.

Figure 7:
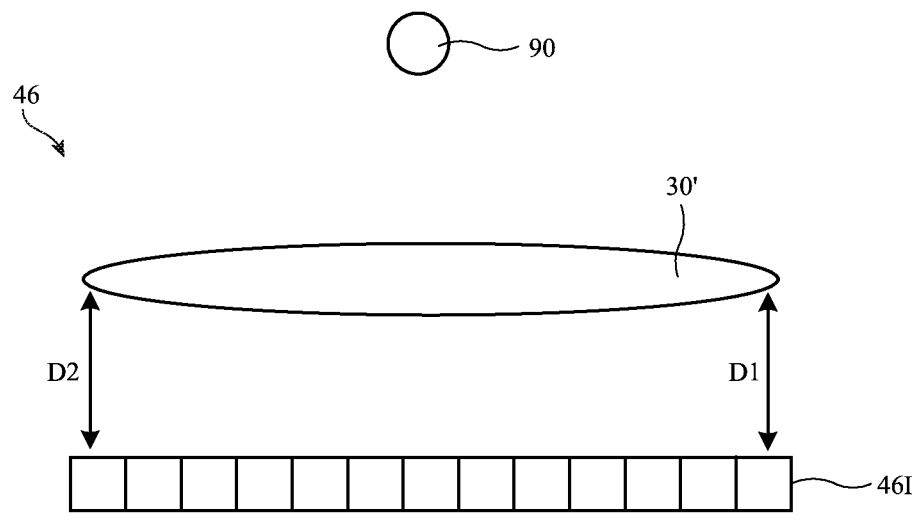
FIG. 7 is a cross-sectional side view of an illustrative camera system in accordance with an embodiment.

In the illustrative configuration of FIG. 7, sensors 70 are being used to monitor the relative position between camera lens 30' in a camera (camera 46 in the example of FIG. 7) and camera image sensor 461 while camera 46 is capturing an image of real-world object 90. A first sensor 70 may, for example, measure distance D1 while a second sensor measure distance D2. Additional sensors(s) 70 may be used, if desired. In this way, the position of lens 30', image sensor 461, and/or associated housing structures may be measured during operation of device 10 so that appropriate action may be taken (e.g., compensating movements of lens 30', image sensor 461, etc.).

Figure 8:
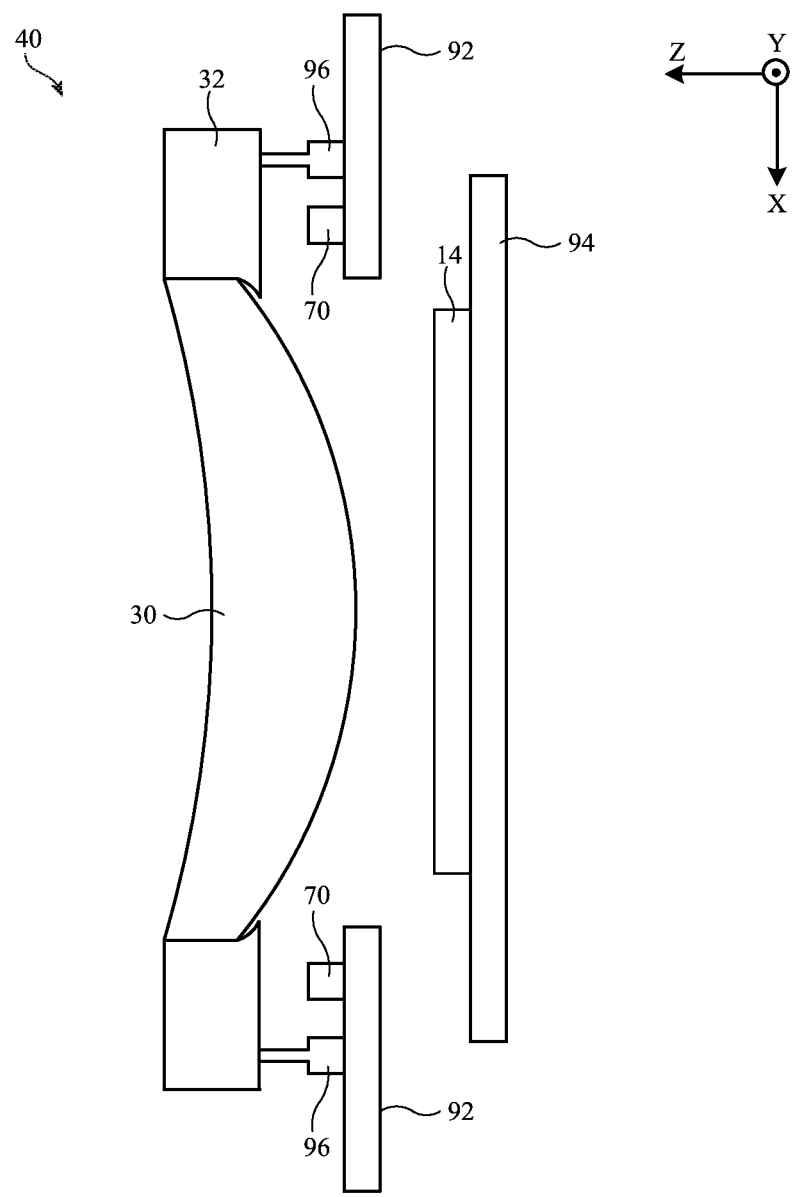
FIGS. 8, 9, 10, 11, 12, and 13 are cross-sectional side views of illustrative optical systems with self-mixing sensors in accordance with embodiments.

FIG. 8 is a cross-sectional side view of a portion of an illustrative optical module with sensors 70. In the example of FIG. 8, optical module 40 includes lens 30 (e.g., a catadioptric lens or other lens) and display 14 (e.g., a display with an array of organic light-emitting diodes). Lens 30 may be supported in optical module support structure 32 (e.g., a lens barrel). Self-mixing sensors 70 and display 14 may be supported by support structures 92 and 94, respectively. Display 14 and support structure 94 may be coupled to support structure 32 (e.g., structure 94 may be part of a lens barrel structure) or, as shown in FIG. 8, structure 94 may be a structure that is separate from support structure 32 (e.g., a support structure in housing portion 12M, a display substrate for a display panel associated with display 14) and that is optionally coupled to support structure 32.

During operation, control circuitry 20 may measure the position of lens 30 using sensors 70. For example, sensors 70 may be mounted directly to a support structure such as support structure 92 of FIG. 8 (e.g. a chassis or other housing structure in housing portion 12M) that is separate from support structure 32 of optical module 40 and which therefore serves to establish a fixed reference frame from which the position of lens 30 may be measured. In arrangements in which display 14 and support 94 are attached to support 92, the sensing arrangement of FIG. 8 may allow sensors 70 to measure the relative position between lens 30 and display 14.

In response to the information on the position of lens 30 gathered by sensor(s) 70, control circuitry 20 can adjust the position of lens 30 (e.g., the position of lens 30 relative to support structure 92 and display 14) using actuators 96. Actuators 96 may, if desired, be mounted between support structure 92 (which serves as the fixed reference frame) and lens 30. Actuators 96 may be piezoelectric actuators, electromagnetic actuators (e.g., motors), and/or other computer-controlled positioners. Two or more, three or more, or other suitable number of actuators 96 may be used to position lens 30. For example, three actuators 96 spaced 120° apart from each other around the perimeter of lens 30 may be used to adjust the orientation of lens 30. Actuators 96 may adjust the separation along axis Z between display 14 and lens 30 and/or may be configured to shift lens 30 laterally (e.g., along dimensions X and/or Y).

Adhesive may be used in mounting lens 30 to support structure 32. In this type of arrangement, there may be a potential for glue shrinkage to affect the relative position between lens 30 and support structure 32. This can affect the measurement of the position of lens 30, because the arrangement of FIG. 8 involves indirect lens position measurements (measurements in which lens position is determined by measuring lens barrel position and inferring lens position from measured lens barrel position), rather than direct lens position measurements.

Figure 9:
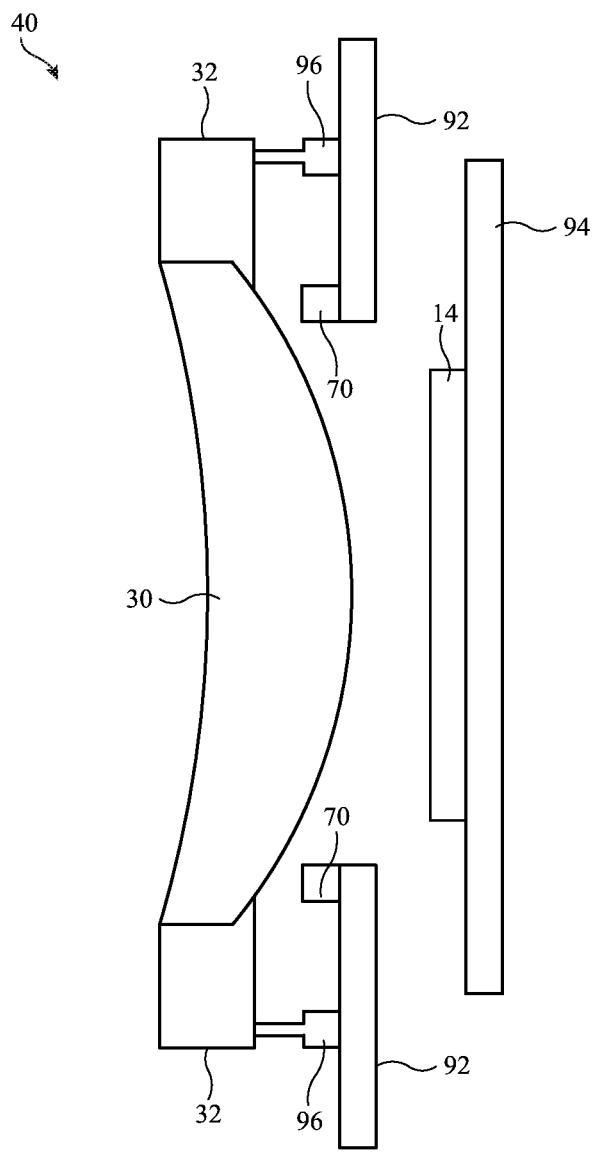

If desired, the position of lens 30 may be measured directly (rather than indirectly through support structure 32 as shown in FIG. 8). FIG. 9 is a cross-sectional side view of an illustrative optical module in which the position of lens 30 relative to structure 92 is measured directly (e.g., because light 84 reflects directly from the inwardly facing surface of lens 30).

Figure 10:
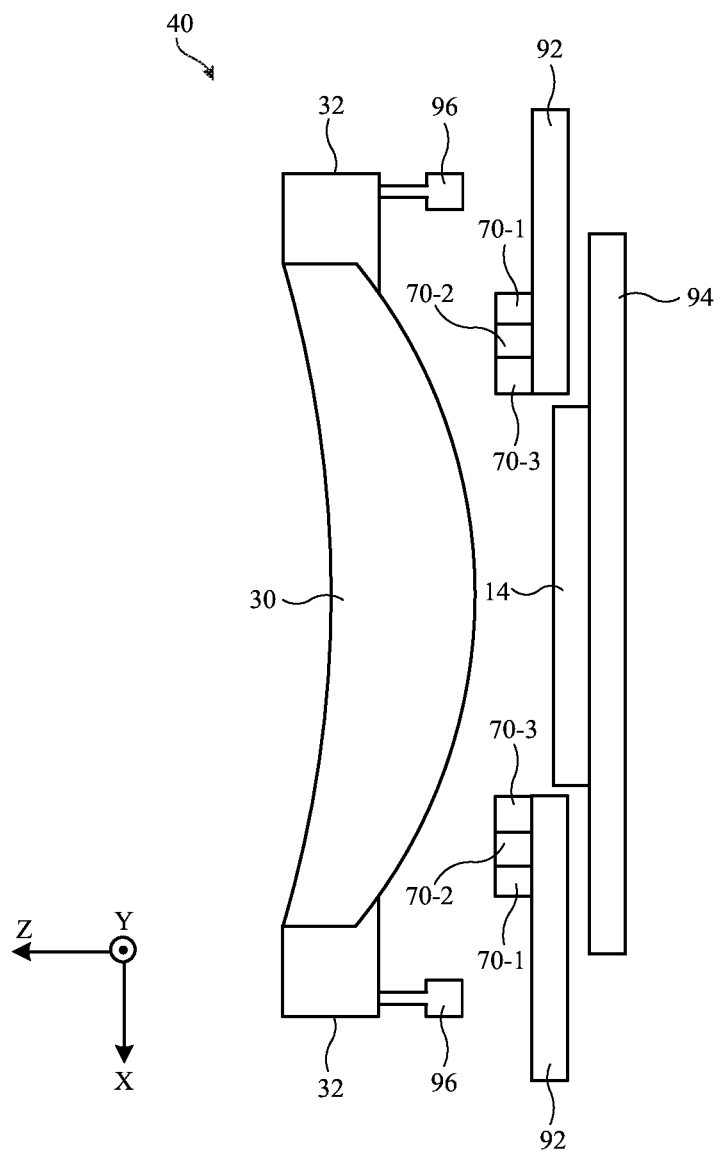

Other directly lens position sensing arrangements may be used, if desired. In the example of FIG. 10, there are multiple sensors 70 (e.g., one or more sets of three sensors 70-1, 70-2, and 70-3) for measuring displacement in different directions. In this illustrative configuration, each sensor 70-1 may emit light 84 that propagates on the X-Z plane and therefore measures lens position along this first direction, each sensor 70-2 may emit light 84 that propagates on the Y-Z plane and therefore measures lens position along this second direction that is different than the first direction, and each sensor 70-3 may emit light 84 that propagates in the Z direction (e.g. a direction that is different than the first and second directions). With this configuration, sensors 70-1 and 70-2 can detect lateral motion of lens 30 (e.g., motion along the X and Y axes of FIG. 10). Each sensor 70-3 measures distance along only the Z dimension (in this example), thereby decoupling these Z-axis measurements from the lateral position measurements made using sensors 70-1 and 70-2.

Figure 11:
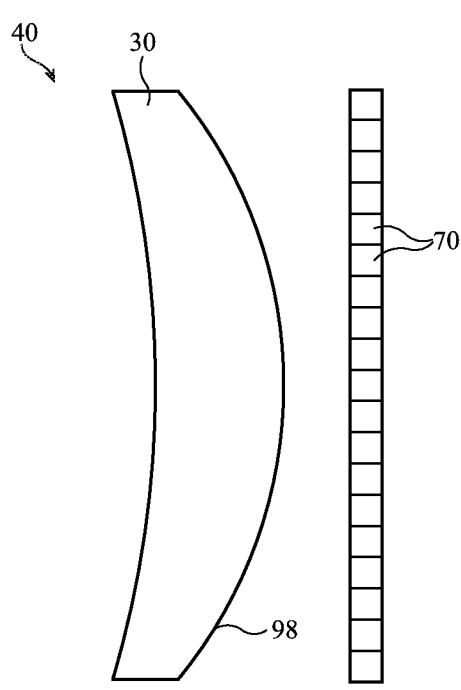

In the example of FIG. 11, an array of self-mixing sensors 70 (e.g., a dense array of at least 10, at least 100, fewer than 1000, fewer than 50, or other suitable number) has been provided in device 10. Sensors 70 may face the inwardly-facing surface of lens 30 (e.g., lens surface 98). During operation, sensors 70 can sense the position of surface 98 and thereby measure deformations to the shape of surface 98. This information may be used dynamically by control circuitry 20 (e.g., to adjust lens 30 by deforming the shape of surface 98 and/or by moving lens 30, to adjust display 14, and/or to adjust other structures in device 10 using actuators, to adjust image data such as by warping displayed images on display 14 to counteract lens distortion, etc.). If desired, the array of sensors 70 of FIG. 11 may be located behind display 14 (e.g., display 14 may be partially transparent so that light from sensors 70 can pass through display 14).

Figure 12:
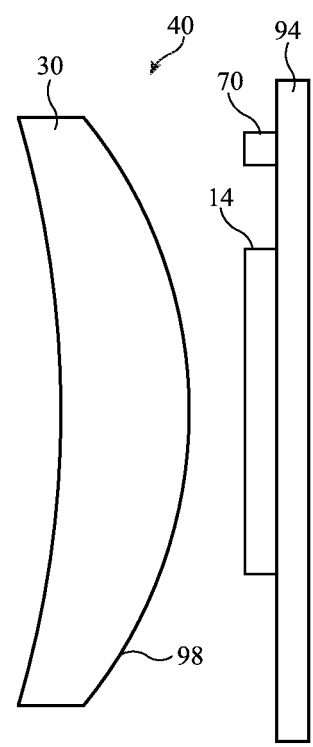

Another illustrative arrangement is shown in FIG. 12. As shown in the configuration of FIG. 12, one or more sensors 70 may be mounted on support structure 94 (e.g. a housing support structure, display panel substrate for display 14, and/or other structure forming part of display 14 and/or directly attached to and/or supporting display 14).

Figure 13:
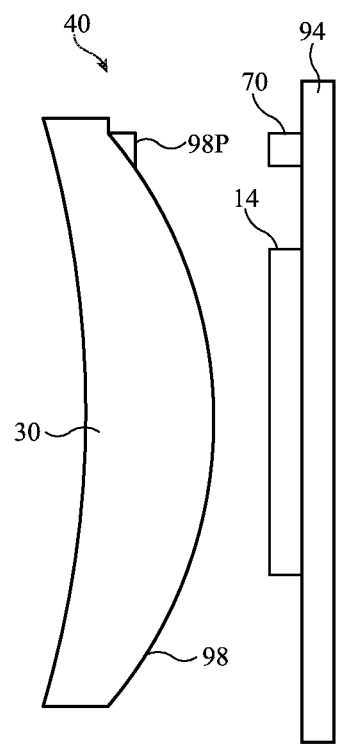

FIG. 13 shows how lens 30 may be provided with a planar surface such as surface 98P or other surface that deviates from inner optical surface 98 of lens 30. Planar surface 98P may help enhance optical feedback to sensor 70 by increasing the amount of emitted light from sensor 70 that is reflected from the surface of lens 30 towards sensor 70. In the absence of a surface such as surface 98P that is oriented to reflect light 84 back to sensor 70, light 84 may tend to reflect in a direction that is not as well aligned with sensor 70.

Sensors 70 can be used to measure the positions of lenses 30 in optical modules 40 and/or other lenses (e.g., camera lenses). For example, one or more sensors 70 may be used to measure the position of a left lens in a left optical module and one or more sensors 70 may be used to measure the position of a right lens in a right optical module. Control circuitry 20 can measure lens position separately for left and right optical modules 40 and can adjust lens position separately for the left and right optical modules using individually adjustable actuators 96. The ability to control left and right lens-to-display separation separately can assist users with vision defects such as users with different optical powers (eye glass prescriptions) for their left and right eyes, thereby reducing or eliminating the need for providing modules 40 with user-specific corrective lenses.

If desired, actuators 96 may be used to shake (e.g., vibrate) lenses (e.g., lenses 30) to dislodge dust and/or other debris from the surfaces of the lenses. This actuator-based cleaning arrangement may be particularly helpful in cleaning inwardly facing lens surfaces such as surface 98 of lens 30, because these surface may not be easily accessed by the user. Vibrations to clean lenses such as lenses 30 in optical modules 40 may be applied to the lenses each time device 10 is powered up and/or at other suitable times.

Figure 14:
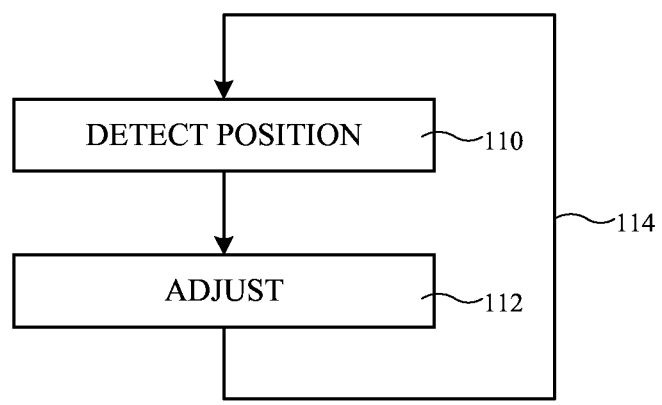
FIG. 14 is a flow chart of illustrative operations associated with operating an electronic device with a self-mixing sensor in accordance with an embodiment.

Illustrative operations associated with using device 10 are shown in FIG. 14.

At suitable times (e.g. upon power up, in response to detection of a drop event with an inertial measurement unit and/or other sensor in device 10, in response to a user command, according to a schedule, etc.) measurements of position may be made by control circuitry 20 (block 110).

During the operations of block 110, sensors 70 may measure distances D between sensors 70 and adjacent structures in device 10. Distances D may correspond to distances between sensors 70 and structures such as the lens surfaces and/or lens barrels for lenses 30, displays 14 (e.g., display substrates and/or other display structures), cameras, support structures in device 10 for supporting portions of optical modules 40 such as lenses 30 and/or displays 14, support structures in device 10 for supporting other optical components, and/or other structures. Sensors 70 may be coupled to lenses 30, displays 14, lens barrels (support structures 32), display support structures, housing structures such as structures for supporting cameras, cameras, and/or other structures in device 10. In this way, information on the relative and/or absolute positions of these structures and therefore associated information on the translational and/or angular alignment and orientation of these structures may be gathered (e.g., information on misalignment of these structures relative to their desired alignment such as information on lens alignment, display alignment, optical module alignment, lens surface shape, camera alignment, housing structure alignment, and/or other information on how structures in device 10 may be misaligned relative to their desired positions). In systems with variable focus (e.g., systems in which the distance between lenses 30 and displays 14 in optical modules 40 is adjusted to adjust focus to place computer-generated content on displays 14 at various different virtual image distances to help reduce vergence-accommodation mismatch), information can be gathered by sensors 70 on misalignment resulting from deviations between the positions of lenses 30 and their desired adjusted locations).

During the operations of block 112, control circuitry 20 may adjust adjustable components in device 10 based on the measurements from sensors 70. For example, actuators in device 10 may be adjusted to reposition lenses 30, displays 14, optical modules 40, support structures 32, cameras 46, support structures in housing portion 14M, and/or other structures in device 10. In this way, detected misalignment in the position of a component (e.g., misalignment of lenses, displays, support structures, portions of lenses leading to lens deformation, image sensors, camera lenses, other portions of cameras 46, and/or other components and/or structures in device 10 relative to each other) can be corrected. In an illustrative configuration, in response to detecting that lens 30 is not currently in its desired position, actuators 96 may move lens to the desired position (e.g., lens 30 may be moved laterally in dimensions X and/or Y, vertically in dimension Z, angularly by tilting about X, Y, and/or Z axes, etc.). If desired, the shape of lens 30 may be changed using actuators (e.g., by applying force that deforms lens 30). This allows an undesired lens shape to be corrected.

In addition to or instead of moving or otherwise physically adjusting all or some of the components in optical modules 40, cameras in device 10, and/or other optical components and/or housing structures in device 10 in response to the data gathered using self-mixing sensors 70, control circuitry 20 may make adjustments to image data and/or other data handled by device 10. For example, if measurements from sensors 70 indicate that display 14 has shifted to the left from its desired position, control circuitry 20 can warp (shift, rotate, and/or shear) the data for the image being displayed by display 14 to shift the image back to the right by a corresponding amount. In this way, detected optical component misalignments can be corrected digitally (e.g., by processing captured image data from cameras 46 and/or by processing image data being supplied to displays 14 to adjust images for measured misalignment).

As indicated by line 114, the operations of blocks 110 and 112 may be performed continuously (e.g., according to a schedule, in response to detected drop events, in response to user input, etc.). In this way, optical components in device 10 may be maintained in satisfactory alignment, even if the positions of these devices is affected by drop events or other high-stress conditions.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
  a head-mounted housing;
  at least one optical module in the head-mounted housing, wherein the optical module has a display and has a lens that is configured to present an image from the display to an eye box;
  an optical self-mixing sensor configured to measure distance to the lens; and
  an actuator configured to adjust the lens based on the measured distance.

2. The head-mounted device defined in claim 1 wherein the actuator is configured to move the lens in response to the measured distance.

3. The head-mounted device defined in claim 2 wherein the lens has a planar portion and wherein the optical self-mixing sensor is configured to emit a beam of light that reflects from the planar portion back to the optical self-mixing sensor.

4. The head-mounted device defined in claim 2 wherein the optical module comprises a lens barrel configured to support the lens and wherein the optical self-mixing sensor is configured to measure the distance to the lens by measuring a distance between the optical self-mixing sensor and the lens barrel.

5. The head-mounted device defined in claim 2 wherein the lens has a lens surface and wherein the optical self-mixing sensor is configured to measure the distance to the lens by emitting light that reflects from the surface and detecting the reflected emitted light.

6. The head-mounted device defined in claim 2 wherein the distance measured by the optical self-mixing sensor is a separation between the lens and the display.

7. The head-mounted device defined in claim 2 wherein the optical self-mixing sensor is configured to measure lateral movement of the lens relative to the optical self-mixing sensor independently of measuring separation between the lens and the display.

8. The head-mounted device defined in claim 2, wherein the actuator is configured to tilt the lens about an axis in response to the measured distance.

9. The head-mounted device defined in claim 2, wherein the actuator is configured to move the lens towards the display in response to the measured distance.

10. The head-mounted device defined in claim 2, wherein the lens is separated from the display in a first direction and wherein the actuator is configured to move the lens in a second direction that is orthogonal to the first direction in response to the measured distance.

11. A head-mounted device, comprising:
- a head-mounted housing;
- at least one optical module in the head-mounted housing, wherein the optical module has a display and has a lens that is configured to present an image from the display to an eye box;
- an optical self-mixing sensor configured to measure distance to the lens; and
- an actuator configured to move the lens in response to the measured distance, wherein the optical self-mixing sensor comprises a laser diode configured to emit light having a wavelength of 800-1100 nm.

12. A head-mounted device, comprising:
- a head-mounted housing;
- optical modules supported in the head-mounted housing, wherein each optical module has a display and has a lens configured to present an image from the display to a corresponding eye box;
- optical self-mixing sensors configured to measure the lenses of the optical modules, wherein each optical module has an array of the optical self-mixing sensors, wherein each lens has a lens surface, and wherein the array of optical self-mixing sensors in each optical module measures deformation of the lens surface in that optical module by measuring distances between the optical self-mixing sensors of the array and the lens surface; and
- actuators, wherein each actuator is associated with a respective one of the optical modules and is configured to move the lens of that optical module relative to the display of that optical module based on the lens measurements.

13. The head-mounted device defined in claim 12 wherein there are at least two of the optical self-mixing sensors for each of the lenses.

14. The head-mounted device defined in claim 12 wherein each optical self-mixing sensor has a laser that emits light and has a detector and wherein the detectors of the optical self-mixing sensors are each configured to detect the emitted light from that optical self-mixing sensor after the emitted light has reflected from the lens surface.

* * * * *